July 26, 1960  A. H. HAROLDSON ET AL  2,946,087
APPARATUS AND METHOD FOR CALENDERING PLASTIC SHEET MATERIAL
Filed July 26, 1957  2 Sheets-Sheet 1
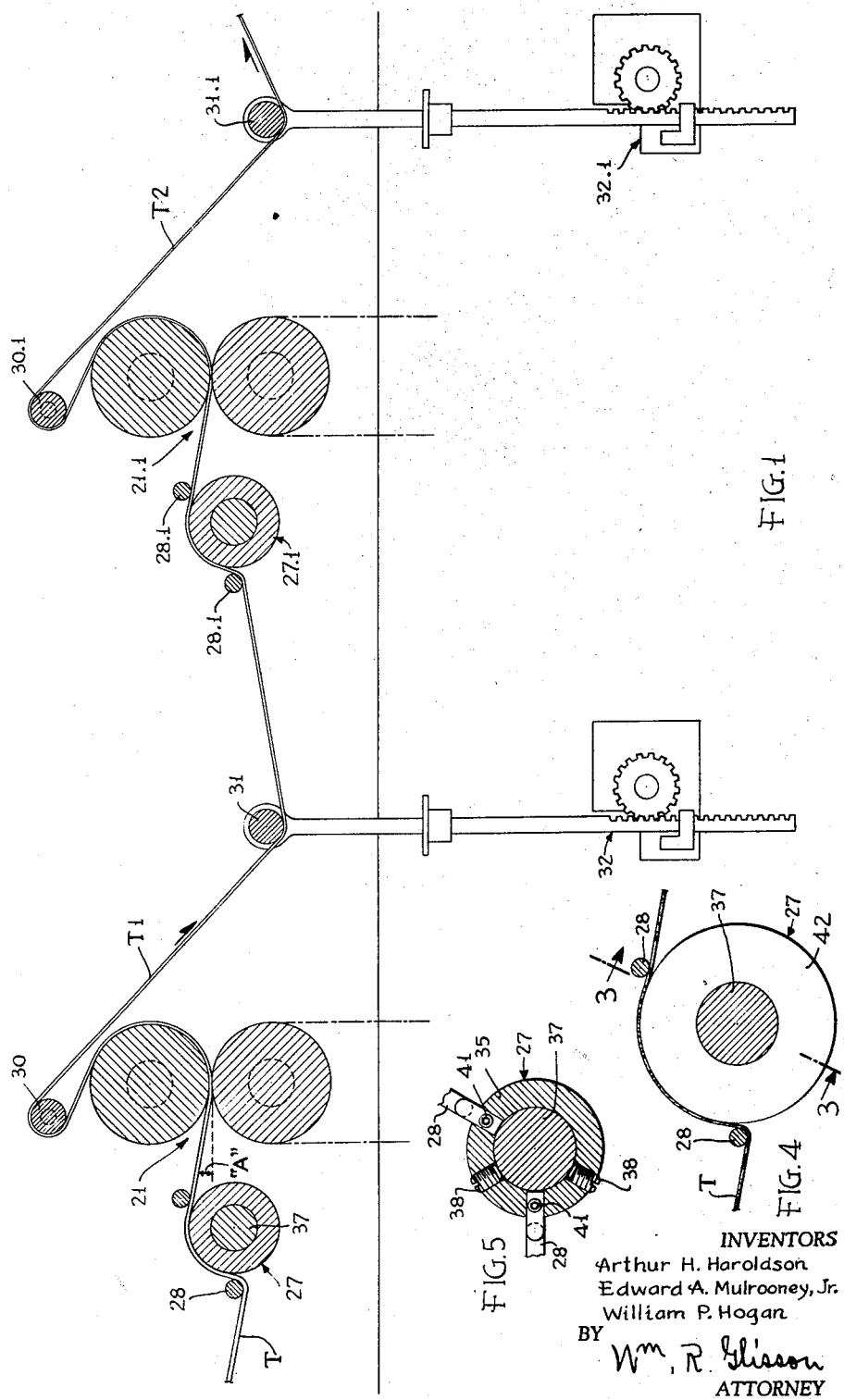
INVENTORS
Arthur H. Haroldson
Edward A. Mulrooney, Jr.
William P. Hogan
BY Wm. R. Glisson
ATTORNEY July 26, 1960 A. H. HAROLDSON ET AL 2,946,087
APPARATUS AND METHOD FOR CALENDERING PLASTIC SHEET MATERIAL
Filed July 26, 1957 2 Sheets-Sheet 2
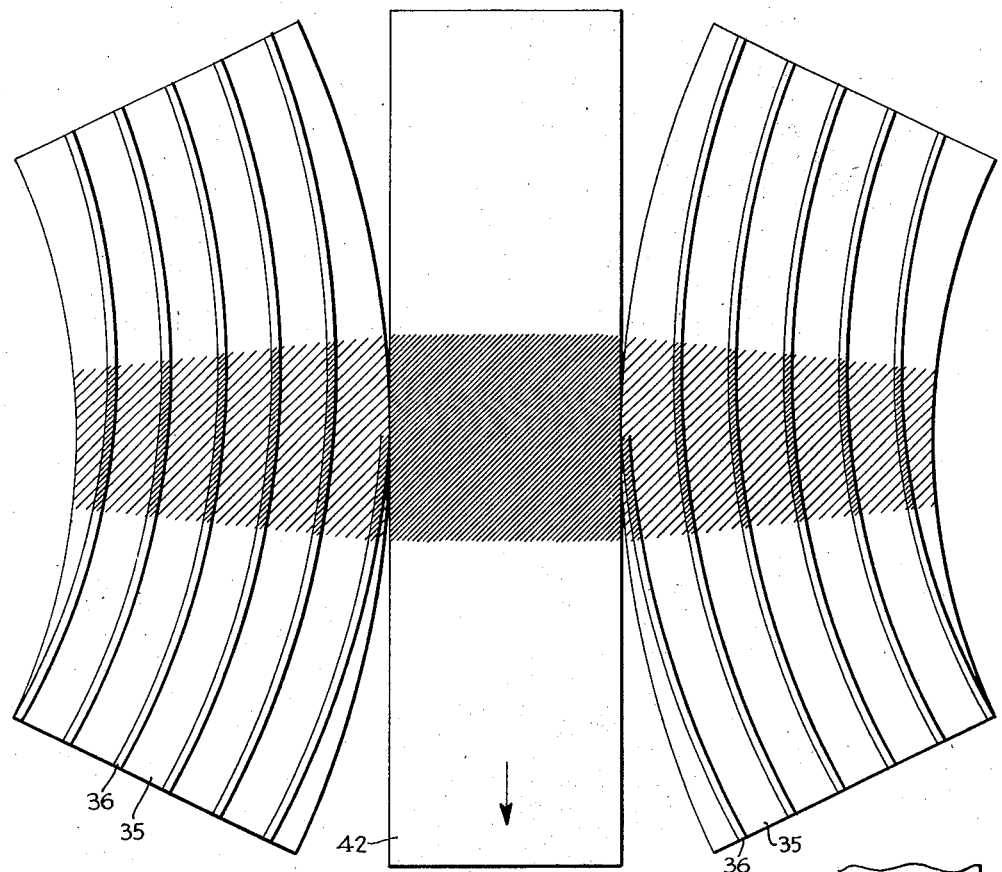
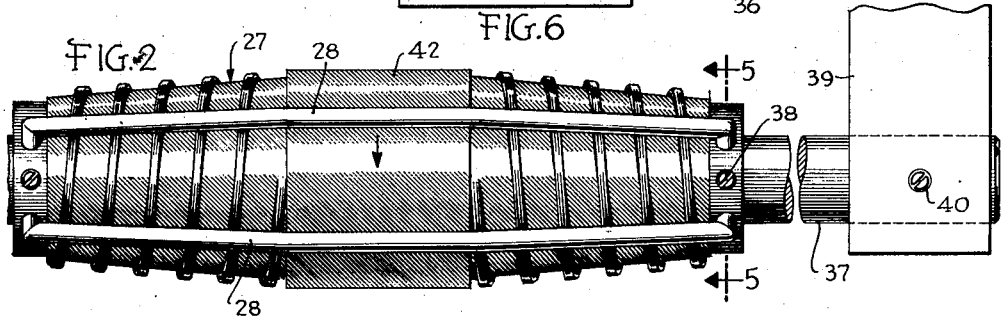
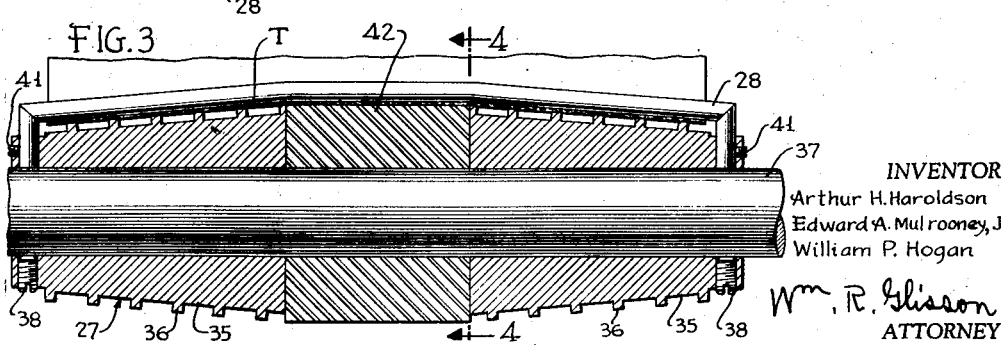
INVENTORS
Arthur H. Haroldson
Edward A. Mulrooney, Jr.
William P. Hogan
Wm. R. Glisson
ATTORNEY

2,946,087
APPARATUS AND METHOD FOR CALENDERING PLASTIC SHEET MATERIAL

Arthur H. Haroldson, Newark, Edward A. Mulrooney, Jr., New Castle, and William Paul Hogan, Newark, Del., assignors to Continental-Diamond Fibre Corp., Newark, Del., a corporation of Delaware Filed July 26, 1957, Ser. No. 674,465

8 Claims. (Cl. 18—2)

This invention relates to apparatus and method for calendering plastic sheet material and has for an object the provision of improvements in this art.

One of the principal objects of the invention is to provide apparatus and method for guiding a plastic sheet to calendering rolls to prevent wrinkling or puckering and waviness in the calendered sheet.

One of the particular objects of the invention is to feed a sheet of plastic material to calendering rolls in a state of transverse tension to aid the rolls in causing material to flow outward and thereby avoid the formation of wrinkles in the middle of the sheet.

Another object is to provide a sheet guiding device which includes means for holding the advancing sheet upon a guiding surface for a sufficient length of travel to cause the outer edges of the sheet to diverge outwardly.

Another object is to provide means for minimizing drag at the mid-width of the advancing sheet.

Another object is to provide sufficient surface contact and friction with the calender rolls to draw the sheet material through the rolls when making heavy reductions.

The above and other objects and advantages of the invention and various features of novelty will be apparent from the following description of an exemplary embodiment thereof, reference being made to the accompanying drawings, wherein:

Fig. 1 is a side elevation and section of apparatus embodying the invention;

Fig. 2 is a general top plan view, taken at a slight angle from vertical, of a tape guide device;

Fig. 3 is an axial section through the guide device, the section being taken on the line 3—3 of Fig. 4;

Fig. 4 is a trans-axial section taken on the line 4—4 of Figs. 2 and 3;

Fig. 5 is a trans-axial section taken on the line 5—5 of Figs. 2 and 3; and

Fig. 6 is a developed flat plan view of the tape guide device.

The material with which the present invention has been developed is unsintered polytetrafluoroethylene, known to the trade as "Teflon" or "Fluon" or the "Noble Plastic," which has been extruded into sheet form with transverse strength according to a method and apparatus disclosed in our copending application Serial No. 674,463, filed July 26, 1957. As there disclosed, the powder-like "Teflon" material is mixed with a lubricant, extrusion aid or plasticizer, as it is variously called, to increase its flow characteristics and is extruded under very high pressure into sheet or tape form. At the time the sheet comes to the calendering rolls, with which the present invention is concerned, it still contains the plasticizer so that it is flowable and has enough transverse strength to permit it to be spread laterally without splitting.

If the plastic sheet in this form were fed directly to calender rolls which make a considerable reduction in the thickness of the sheet with corresponding increase in length (in the order of three or four to one at one set of rolls) there is also some increase in width. The rolling action tends to cause the material to pucker or wrinkle just ahead of the rolls and if these wrinkles are allowed to form are drawn through the rolls they will be pressed down as permanent folds or creases in a kind of herringbone pattern which cannot be eliminated thereafter. The sheet material is extensively flowable but not pressure-coherent like putty. The molecules of "Teflon" do not have the same affinity for each other as do molecules of other materials and must be forced together to form a coherent body. The extruded tape has a definite fibrous consistency with the fibers elongated longitudinally or in the machine direction.

According to the present invention this tendency to pucker ahead of the calendering rolls is eliminated by stretching the sheet laterally as it is fed to the rolls so as to cause the outer edges to enter the rolls at an angle flaring outward toward the rolls. This can be accomplished by using a center-crowned guide member such as a non-rotatable roll, and is aided by forming outwardly flared guide elements on the member, and by providing turnable or rotary guide means for the center of the sheet. The guide elements may be formed as spiral ribs, preferably with surface roughening. The sheet is constrained to follow the roll-like crowned guide member for a certain distance by confining bars above the surface of the guide member.

Some relief from puckering can be achieved by merely putting tension on the sheet strand ahead of the calender rolls, or by using an idler pressing roll similar to the "billy roll" used in rolling steel sheet but this does not produce any appreciable increase in width in the rolled sheet and produces a very weak tape of inferior quality. With the present apparatus and method it is helpful to have some back tension in the sheet ribbon or tape but it need not be nearly so great as would be required to minimize wrinkling solely by back tension.

In some prior methods of calendering plastic ribbon or tape the strand has been passed around one roll of a set, then through the bight, nip or bite between the rolls, then off around the other roll. With that arrangement, however, it has been found that wrinkling cannot be eliminated. The strand must be fed directly into the bight between the rolls. However, with the guide means of the present invention it has been found that there is an optimum angle of approach away from a straight-in direction which gives the maximum increase in width and a corresponding maximum quality of product.

Also the tape can be passed after calendering partly around one of the rolls to increase the pull by a snubbing action and this permits greater reduction at a single pass than could otherwise be obtained so that the full desired reduction of seven or eight to one and the desired increase in width can be obtained with two sets of calender rolls instead of the four or five sets which otherwise would be required.

As shown in Fig. 1, a tape T which has been extruded in such a way as to have good transverse strength is passed through a first set of driven calendering reducing rolls 21 and the thinned and widened tape T1 from the first set of rolls is passed through a second set of driven calendering reducing rolls 21.1. While approaching the first set of rolls 21 the tape passes over a guide device 27 having retaining bars 28 to cause the tape to follow the curved surface of the guide device for a given length of arc.

To cause the rolls to have more pull on the tape an idler bar or roll 30 is provided above the rolls and the tape is passed around the idler bar to increase its arc of contact with a calendering roll and increase the pull by a snubbing action.

From the first set of calendering rolls the tape passes to one or more additional sets of calendering rolls. Here the second set is designated as 21.1 (as noted) with the guide device 27.1, the retaining bars 28.1 and the idler bar or roll 30.1.

After leaving the first set of calender rolls the tape T1 passes under a guide bar or roll 31 of a tension device 32 which controls the speed of the rolls 21.

The tape T2 from the second set of rolls passes under a guide bar or roll 31.1 of a tension device 32.1 which controls the speed of the rolls 21.1.

After leaving the last set of calender rolls the tape is pulled through a drying oven where the oil is removed and evacuated.

As shown in Figs. 2 and 3, the guide device 27 includes fixed truncated cone parts 35 having spiral ribs 36 which spread laterally in the direction toward the calender rolls. The conical parts 35 are secured to a supporting shaft or bar 37, as by set screws 38, and the bar is turnably mounted in brackets 39 which extend from the frame which carries the calender rolls. One of the brackets is shown in Fig. 2. The shaft 37 is adjustably secured in selective turned positions in the brackets, as by set screws 40. The stems of the spaced guide bars 28 are inserted in radial holes in the end parts 35 and are held by set screws 41.

It has been found that it is not necessary to extend the conical parts 35 to the center line, although this arrangement has worked, and that a fixed drag guide is not needed at the center. Better results have been obtained by using a right cylindrical guide part 42 at the center and making it as a roll which is free to turn on the shaft 37. The end parts are made of metal, such as brass, and the roll is made of metal or a hard plastic material, preferably a fabric or paper base laminate.

The arc of contact of the tape with the arcuate guide surfaces which has proved best is about 90° to 120°, this angle of contact being maintained by the guide bars 28. In the form shown, the guide bars are 120° apart, and, depending on their spacing above the guides, this will give an arc of tape tangency of about 100° or more. Also the angle "A" (Fig. 1) at which the arc of contact is turned relative to a horizontal central plane through the bight or nip of the calender rolls affects the width of the tape issuing from the rolls. By turning the shaft 37 with the guide assembly back and forth the optimum position is found. The angle "A" which the tape strand then makes with a horizontal plane, or medial plane between the rolls, will depend on the vertical position and distance from the calender rolls of the guide device; but in general it has been found that the angle will lie between 0° and 20° with best results at about 10°. When the arc of tape contact is turned back from the calender rolls, with an increase of the angle of approach, the resistance or snubbing action of the tape on the guide increases until there is a decrease in the spreading action on the tape; and when the arc of tape contact is turned forward toward the calender rolls, with a decrease of the angle of approach, the resistance or snubbing action of the tape decreases until there is not enough drag on the spreading elements of the guides and there is again a decrease in the width of the rolled tape. In between, a position is found where the drag is adequate to cause a good spreading action but not so great as to cause the rolls to draw the edges toward each other again and to injure the tape by excessive strain.

Apparently the angular approach may also cause some ironing or flattening action of the tape in passing in an arc around one roll similar to the effect produced in steel sheet by the presser roll mechanism described in Patent 2,348,258 Klein but there are other and more important actions on the plastic tape which are provided by the present crowned, spreading drag guide means.

The crowned arrangement also tends to keep the tape centered while approaching the rolls much like a belt riding up to center on a crowned pulley.

The edge-tapered guides, without ribs, have some side spreading action on the tape, but the directive flaring ribs make the action much more pronounced.

It is thus seen that the invention provides improved apparatus and method for guiding and rolling plastic tape to give heavy reductions in a single pass without producing wrinkles or riffles, to the end that a tape of uniform character and maximum side strength is produced.

While one embodiment has been disclosed for purposes of illustration, it is to be understood that there may be various embodiments and modifications within the general scope of the invention.

What is claimed is:

1. Apparatus for calendering plastic sheet material which tends to pucker at the center of the calender rolls and which will take a permanent set in creases and adhere to itself in folds when pressed by the rolls if not fed in smoothly, such as unsintered polytetrafluoroethylene, comprising in combination, driven calender rolls which positively draw the sheet material through between them against back tension, and a guide device disposed closely adjacent and in front of the calender rolls for smoothly guiding the sheet material into the rolls along a line lying near the medial line or plane between the rolls, said guide device including guide members disposed in transverse axial alignment on opposite sides of a longitudinal center line of the sheet travel which are arcuately convex in the direction of movement of the sheet material and which are tapered upwardly from the ends toward the center, and circumferentially spaced sheet retaining and guiding elements disposed above and near the arcuate convex surface of said guide members and parallel thereto for causing the sheet material to travel in an arcuate path over the arcuate convex surfaces of said guide members, the arc of contact being less than 180 degrees.

2. Apparatus as set forth in claim 1, further characterized by the fact that said guide members at parts extending inward from the ends are provided with surface guide elements which diverge outwardly from a longitudinal center line of sheet travel in a direction toward said calender rolls for spreading the sheet outwardly at the sides as it enters the rolls.

3. Apparatus as set forth in claim 1, further characterized by the fact that said retaining elements hold the sheet material upon the guide members for an arc of between 90 and 120 degrees, the arc being located principally on the side of the guide members which is away from the rolls.

4. Apparatus as set forth in claim 1, further characterized by the fact that said guide members are non-rotatably fixed in position when in use, and a cylindrical rotatable guide member disposed at the center between the inner ends of said tapered guide members.

5. Apparatus as set forth in claim 4, in which said tapered guide members are provided with surface guide ribs which diverge outwardly in a forward direction to spread the outer edges of the sheet material outwardly as it advances to said calendar rolls.

6. Apparatus as set forth in claim 1, in which said guide members and retaining elements are located in such position as to feed the sheet material to the rolls at an angle of about 10 degrees to the central plane between the rolls.

7. The method of calendering extruded poytetrafluoroethylene sheet incorporating a plasticizer in the cold state to improve its strength and increase its length in the order of three or more to one in one set of smooth calender rolls with considerable increase in width while avoiding puckering in the center of the sheet as it passes through the calender rolls, which comprises, reducing the extruded polytetrafluoroethylene sheet in the cold plasticized state by the desired amount of three or more to one in a set of smooth driven calender rolls while gripping the sheet with a snubbing action on one of the rolls of the set to exert a strong forward pull and tension in it as it advances to the calender rolls, snubbing and laterally spreading the sheet in the cold plasticized state directly in front of the calender rolls by passing it in an arc over a transversely crowned arcuate surface having no forward movement for a distance inward from each edge of the sheet, the arcuate snubbing surface having such relationship to the calender rolls as to direct the sheet into the nip of the rolls without substantial arcuate contact with any of the rolls on the entry side, and exerting back tension on the cold plasticized sheet as it moves to said arcuate snubbing surface.

8. The method of calendering cold plasticized polytetrafluoroethylene sheet as set forth in claim 7, further characterized by the fact that the sheet at the arcuate snubbing surface is directed outwardly by guide elements for a distance from the outer edges and is supported on a forwardly moving surface in a center zone of its width.

References Cited in the file of this patent

UNITED STATES PATENTS

| | | |
|---|---|---|
| 2,367,005 | Clarke | Jan. 9, 1945 |
| 2,412,187 | Wiler et al. | Dec. 3, 1946 |
| 2,594,846 | Bechter | Apr. 29, 1952 |
| 2,618,012 | Milne | Nov. 18, 1952 |
| 2,753,591 | Stevens et al. | July 10, 1956 |
| 2,790,999 | Peck et al. | May 7, 1957 |